United States Patent
Beuch et al.

(10) Patent No.: US 11,341,006 B1
(45) Date of Patent: May 24, 2022

(54) DYNAMIC REPLACEMENT OF DEGRADING PROCESSING ELEMENTS IN STREAMING APPLICATIONS

(71) Applicant: International Business Machines Corporation, Armonk, NY (US)

(72) Inventors: Daniel Beuch, Rochester, MN (US); Michael J. Branson, Rochester, MN (US); Adam Thomas Stallman, Rochester, MN (US); Ryan K. Cradick, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/084,974

(22) Filed: Oct. 30, 2020

(51) Int. Cl.
  *G06F 11/20* (2006.01)
  *G06F 11/36* (2006.01)
  *G06Q 30/04* (2012.01)

(52) U.S. Cl.
  CPC ...... *G06F 11/2028* (2013.01); *G06F 11/3612* (2013.01); *G06Q 30/04* (2013.01); *G06F 2201/85* (2013.01)

(58) Field of Classification Search
  CPC ............. G06F 11/2028; G06F 11/2035; G06F 11/302; G06F 11/3612; G06F 11/3466; G06F 11/1438; G06F 2201/85; G06Q 30/04
  See application file for complete search history.

(56) References Cited

U.S. PATENT DOCUMENTS

| | | | | |
|---|---|---|---|---|
| 8,369,207 | B2* | 2/2013 | Takahashi | G06F 11/2097 370/216 |
| 9,459,757 | B1* | 10/2016 | Barsness | G06F 9/5027 |
| 10,127,086 | B2 | 11/2018 | Ghare | |
| 10,346,272 | B2 | 7/2019 | Johnson et al. | |

(Continued)

FOREIGN PATENT DOCUMENTS

| | | |
|---|---|---|
| CN | 107623639 A | 1/2018 |
| CN | 108009111 A | 5/2018 |

(Continued)

OTHER PUBLICATIONS

Kwon et al., Fault-tolerant Stream Processing using a Distributed, Replicated File System, VLDB '08, Aug. 24-30, 2008, Auckland, New Zealand.

(Continued)

*Primary Examiner* — Yolanda L Wilson
(74) *Attorney, Agent, or Firm* — Garg Law Firm, PLLC; Rakesh Garg; Nathan Rau

(57) ABSTRACT

An embodiment includes monitoring a distributed computing application at runtime for occurrence of a condition, where the condition includes occurrence of a degradation condition on a processing element (PE). The embodiment also includes starting a provisional PE on a second node at runtime while maintaining runtime operation of the PE. The embodiment compares operation of the PE to operation of the provisional PE based on a performance metric associated with the computing resource. The embodiment connects the provisional PE to replace the stream of tuples from the PE to a downstream PE with a stream of tuples from the provisional PE to the downstream PE.

20 Claims, 12 Drawing Sheets

(56) References Cited

U.S. PATENT DOCUMENTS

| | | | |
|---|---|---|---|
| 2003/0135474 A1* | 7/2003 | Circenis | G06Q 30/0283 |
| | | | 705/400 |
| 2006/0230174 A1 | 10/2006 | Hoche et al. | |
| 2011/0083046 A1* | 4/2011 | Andrade | G06F 11/0793 |
| | | | 714/47.1 |
| 2013/0054538 A1 | 2/2013 | Cradick et al. | |
| 2014/0365478 A1 | 12/2014 | Enoki et al. | |
| 2015/0134626 A1* | 5/2015 | Theimer | G06F 11/3055 |
| | | | 707/693 |
| 2019/0102266 A1 | 4/2019 | Park et al. | |
| 2020/0026605 A1* | 1/2020 | Barsness | H04L 67/10 |

FOREIGN PATENT DOCUMENTS

| | | |
|---|---|---|
| CN | 110362600 A | 10/2019 |
| EP | 1647890 A2 | 4/2006 |

OTHER PUBLICATIONS

International Searching Authority, PCT/CN2021/123310, dated Jan. 19, 2022.

* cited by examiner

DYNAMIC REPLACEMENT OF DEGRADING PROCESSING ELEMENTS IN STREAMING APPLICATIONS

BACKGROUND

The present invention relates generally to a method, system, and computer program product for stream computing. More particularly, the present invention relates to a method, system, and computer program product for dynamic replacement of processing elements in streaming applications.

Database systems are typically configured to separate the process of storing data from accessing, manipulating, or using data stored in a database. In traditional, static database systems, data is first stored and indexed in memory before subsequent querying and analysis. In general, such static database systems are not always well-suited for performing real-time processing and analyzing streaming data. For example, static database systems are sometimes unable to store, index, and analyze large amounts of streaming data efficiently or in real time.

Streams-based computing and streams-based database computing have emerged in recent years as developing technologies for database systems. In a streams application, nodes connected to one another across a network allow data to flow from one node to the next. Such data flows encapsulate blocks of data in a "tuple." A tuple is a block of data of one or a variety of different data types, such as integer, float, Boolean, or string data. Groups of tuples are transmitted in sequences referred to as a "stream" or "data stream." In particular, it may occur that data arrives essentially continuously, as a stream of data points corresponding to an ongoing or continuous event.

For example, data representing the price of a particular stock may generally fluctuate over the course of a day, and a data stream management system may continuously receive updated stock prices, e.g., at equal time intervals or as the price changes. Other examples of such data streams include temperature or other environmental data collected by sensors, computer network analytics, patient health data collected at a hospital, or data describing a manufacturing process or other business process(es).

SUMMARY

The illustrative embodiments provide for dynamic replacement of degrading processing elements in streaming applications. An embodiment includes monitoring a distributed computing application at runtime for occurrence of a condition, where the distributed computing application comprises a first node that includes a processing element (PE) receiving a first stream of tuples from an upstream PE, performing a defined process on the first stream of tuples resulting in a second stream of tuples, and transmitting the second stream of tuples to a downstream PE, where the condition includes occurrence of a degradation condition on the PE. The embodiment also includes starting a first provisional PE on a second node at runtime while maintaining runtime operation of the PE, where the first provisional PE receives the first stream of tuples from the upstream PE and performs the defined process on the first stream of tuples. The embodiment also includes comparing operation of the PE to operation of the first provisional PE based on a performance metric associated with the computing resource. The embodiment also includes connecting the first provisional PE to replace the second stream of tuples from the PE to the downstream PE with a third stream of tuples from the first provisional PE to the downstream PE. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
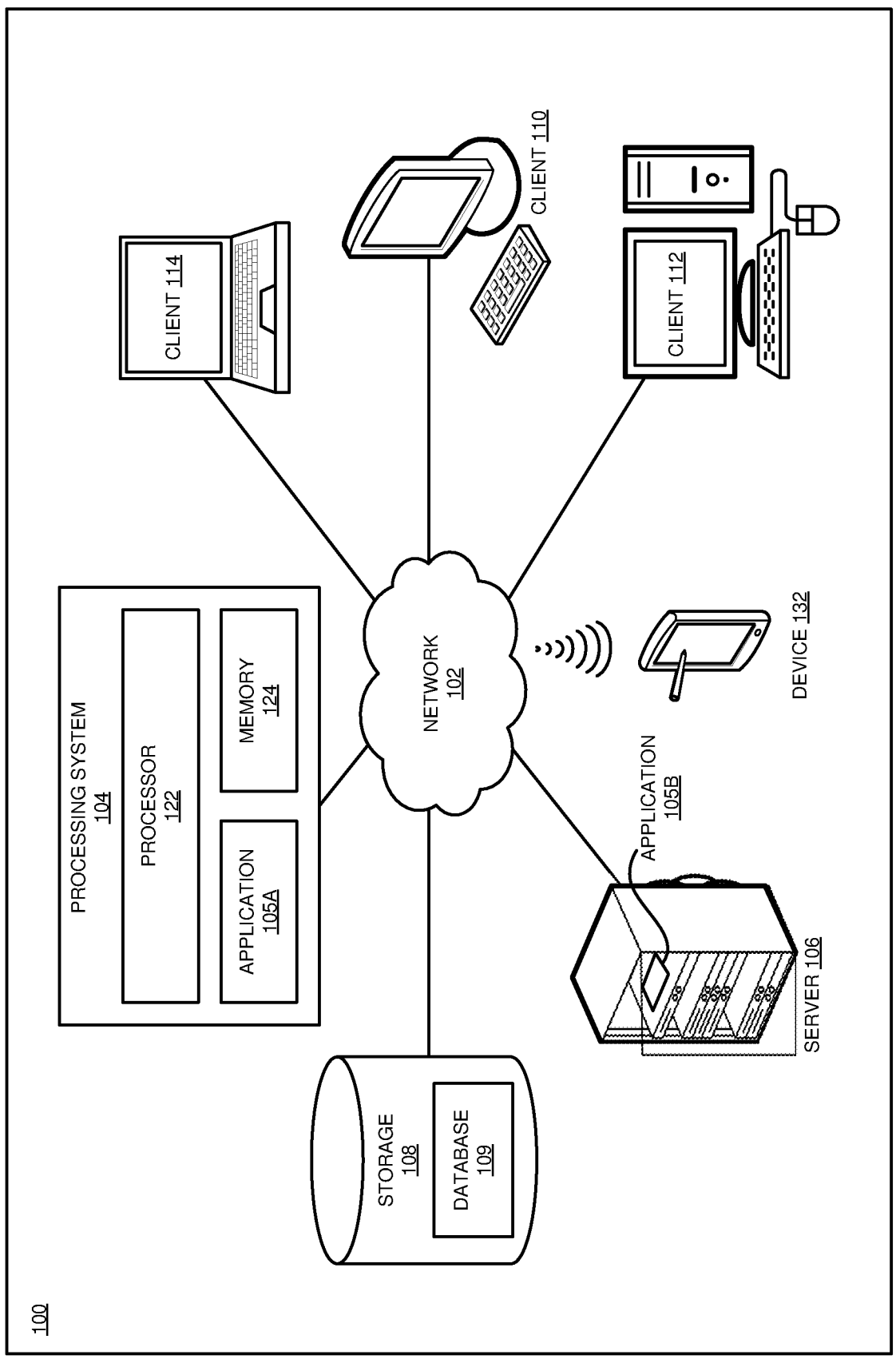
FIG. 1 depicts a block diagram of a network of data processing systems in which illustrative embodiments may be implemented.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

The main components of stream processing applications include tuples, data streams, operators, PEs, and jobs. A "tuple," is an individual piece of the data in a data stream. A "data stream," as used herein, refers to a running sequence of tuples. An "operator," as used herein, is a logical function that manipulates the tuple data from the incoming data stream and produces the results in the form of an output data stream. A "operator graph," as used herein, is a visual representation of the operators connected by the data streams that flow through them and defines the analytic application. A "processing element" or "PE" as used herein is an executable that includes a set of one or more operators that will run in the same process on a network node or computing resource, for example a server, client, host, container, or other computing device, such as a data processing system. A "node," as used herein, is a network node including any electronic device addressable over a computer network that is capable of creating, receiving, and/or transmitting information over the computer network, and may refer to may refer to an element, module, component, board, device or system.

A streams processing job has a directed graph of PEs that send data tuples between the PEs. The PE operates on the incoming tuples, and produces output tuples. A PE has an independent processing unit and runs on a host. The streams platform can be made up of a collection of hosts that are eligible for PEs to be placed upon.

In a stream computing application, PEs are thus connected to one another such that data flows from one PE to the next over a network connection (e.g., over a TCP/IP socket). Data flows from one stream operator to another in the form of a tuple having a sequence of one or more attributes associated with an entity.

Stream computing applications handle massive volumes of data that need to be processed efficiently and in real time. Stream computing is able to achieve high performance streaming and scalability by distributing an application across multiple nodes by creating executables (i.e., PEs), as well as replicating PEs on multiple nodes and load balancing among them. Thus, a stream computing application may continuously ingest and analyze hundreds of thousands of messages per second and up to petabytes of data per day. Accordingly, each stream operator in a stream computing application may be required to process a received tuple within fractions of a second.

An advantage of products, such as IBM Streams, is the massive scalability and performance (IBM is a registered trademark of International Business Machines corporation). Performance advantages include improvements in terms of being able to ingest, filter, analyze, and correlate potentially massively larger volumes of continuous data streams in a given time frame than was previously possible. However, if a streaming application "falls behind" in its processing, the analysis it is performing loses its value, i.e. results of the analysis are based on the past, not the most recent data.

A streaming application might fall behind simply because of poor performance of one part of the application. A streaming application can also fall behind because of failures within the application. A streaming services provider or operating system may support high-availability and application failover, but failure-recovery mechanisms include a period of time where data is not processed while the recovery occurs. For example, the amount of time it takes a processing element (PE) to fail and restart could range from 20 to 30 seconds to several minutes, depending on a number of factors (e.g. a quick failure versus a gradual failure where the PE runs slower and slower until it ultimately fails, the amount of time to create/schedule a new resource to host a restarted PE, the amount of time to deploy the new PE, etc.).

The longer the failure-recovery process takes to complete—the longer the backlog of unprocessed real-time data, resulting in the application falling behind real-time until it "catches up" with the most recent data. If multiple failures occur, lengthy recovery periods could result in the application being completely flooded with real-time data, causing it to completely fail.

The illustrative embodiments of the present disclosure address problems and performance goals particular to streams processing by monitoring its processing elements (PEs) for degradation and replacing a degrading PE (before it fails) with a better performing replica of itself. Some such embodiments provide one or more advantages over prior techniques, such as improving the performance of a streaming application by replacing underperforming PEs, providing a way to avoid PE failures, and associated lengthy recoveries, by proactively replacing a degrading PE with a healthier replica of itself before it fails, and enabling switchover to a replacement PE much faster than going through a full failure-recovery scenario, thereby reducing or preventing the buildup of unprocessed real-time data during the failure-recovery process.

In an illustrative embodiment, a streams manager monitors a streaming application, maintaining statistics that represent the performance of the various PEs that make up the streaming application. In some embodiments, the streams manager monitors PEs for degradation and, when degradation of one or more PEs is detected, performs troubleshooting processes, or issues notification signals or data to a troubleshooting module or separate application. For example, in some embodiments, a PE monitors itself for degradation indicators and signals a streams manager when the PE detects degradation.

In some embodiments, a streams manager detects degradation of a PE by monitoring the PE for occurrence of a condition that serves as a degradation indicator, which may differ from one PE to another. In some embodiments, the thresholds for degradation indicator conditions may also differ from one PE to another. Thus, in some such embodiments, a degradation indicator condition is configurable for each PE.

In some embodiments, a degradation indicator condition includes execution conditions associated with a PE that deviate from a predefined or expected pattern. For example, in some embodiments, indicators of degradation include abnormal amounts of queued tuples (i.e. tuples waiting to be processed on input ports of operators in the PE), abnormal memory usage, number and types of exceptions handled, and abnormal CPU consumption.

In some embodiments, the streams manager monitors a plurality of PEs. In alternative embodiments, the streams manager only monitors a single PE. In some embodiments, the streams manager maintains statistics that represent the normal or expected performance of the PE prior to degradation of the PE. In some embodiments, the streams manager logs the utilization of such computing resources by the PE, allowing for normal utilization patterns to be established and thereby also allowing for abnormal utilization patterns to be detected.

In some embodiments, abnormal amounts of queued tuples includes higher than normal amounts of queued tuples. In some embodiments, abnormal memory usage includes abnormally high rates of change in memory usage. In some embodiments, abnormal CPU consumption includes abnormally high rates of change in CPU consumption.

In some embodiments, when a streams manager detects degradation of a PE, the streams manager performs an initial analysis in connection with the degraded PE. In some such embodiments, the streams manager analyzes the degraded PE to determine whether the indications signifying the degraded performance are actually indications of a problem other than degradation of the degraded performance PE, such as backpressure or one or more cluster computing resources reaching capacity.

In some such embodiments, when a streams manager detects degradation of a PE and does not detect an alternative problem, the streams manager tests the use of one or more provisional PEs as possible replacements for the degrading PE. In some such embodiments, the streams manager communicates with a scheduler to identify a node to host the provisional PE. In some embodiments, the scheduler searches for a node other than the node hosting the PE. In some embodiments, the scheduler also searches for a node based on predetermined rules or criteria, for example availability of computing resources and vicinity to upstream and downstream PEs. In some embodiments, once the scheduler identifies a host node, the scheduler notifies the streams manager of the selected location for the provisional PE.

In some embodiments, the streams manager starts the provisional PE on the identified node at runtime while maintaining runtime operation of the degraded performance PE. In some such embodiments, the streams manager connects the provisional PE to an upstream PE that is the same upstream PE from the degraded PE so that the provisional PE and the degraded PE both receive the same stream of tuples from the same upstream PE at the same time. In some such embodiments, the provisional PE and the degraded PE both perform the same defined process on the stream of tuples, which allows the streams manager to compare the performance of the degraded PE to that of the provisional PE. In some such embodiments, the degraded PE performs the defined process on the stream of tuples resulting in an output stream of tuples that the degraded PE transmits to a downstream PE, while the output of the provisional PE is not connected to any downstream elements.

In some embodiments, the streams manager compares the operation of the degraded PE to that of the provisional PEs based on a performance metric associated with one or more computing resources. For example, in some embodiments, the streams manager compares the operation of the degraded PE to that of the provisional PE by comparing one or more of CPU usage, memory usage, and speed of tuple throughput. In some such embodiments, if the streams manager determines that the provisional PE is performing better than the degraded PE, then the streams manager replaces the degraded PE with the provisional PE, for example by connecting the output of the provisional PE to the downstream PE in place of the degraded performance PE, and the streams manager shuts down the degraded PE. In some embodiments, the streams manager sends a notification to the user via a user interface regarding the replacement of the degraded PE with the provisional PE.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
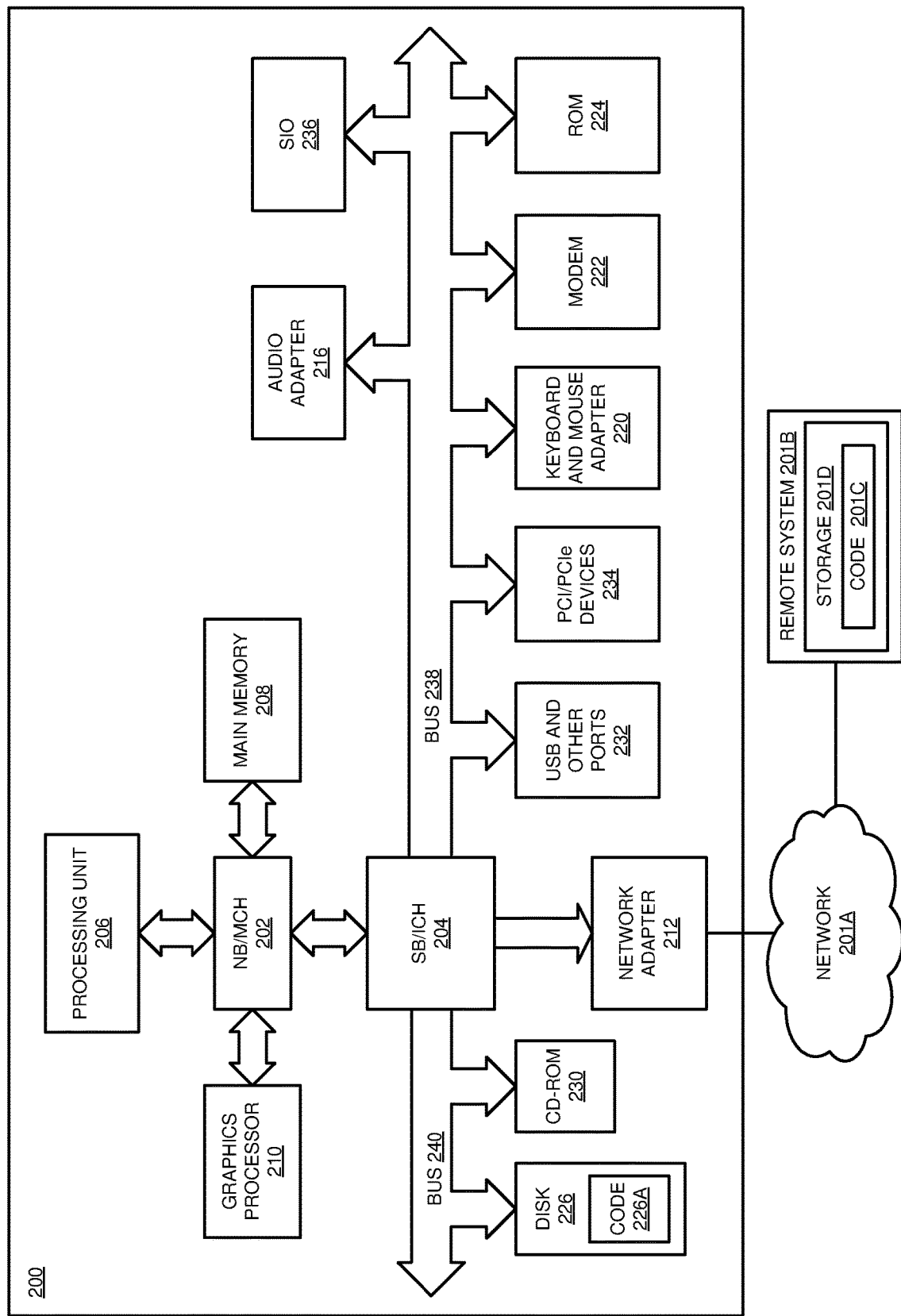
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes PEs of a stream processing application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by stream processing application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
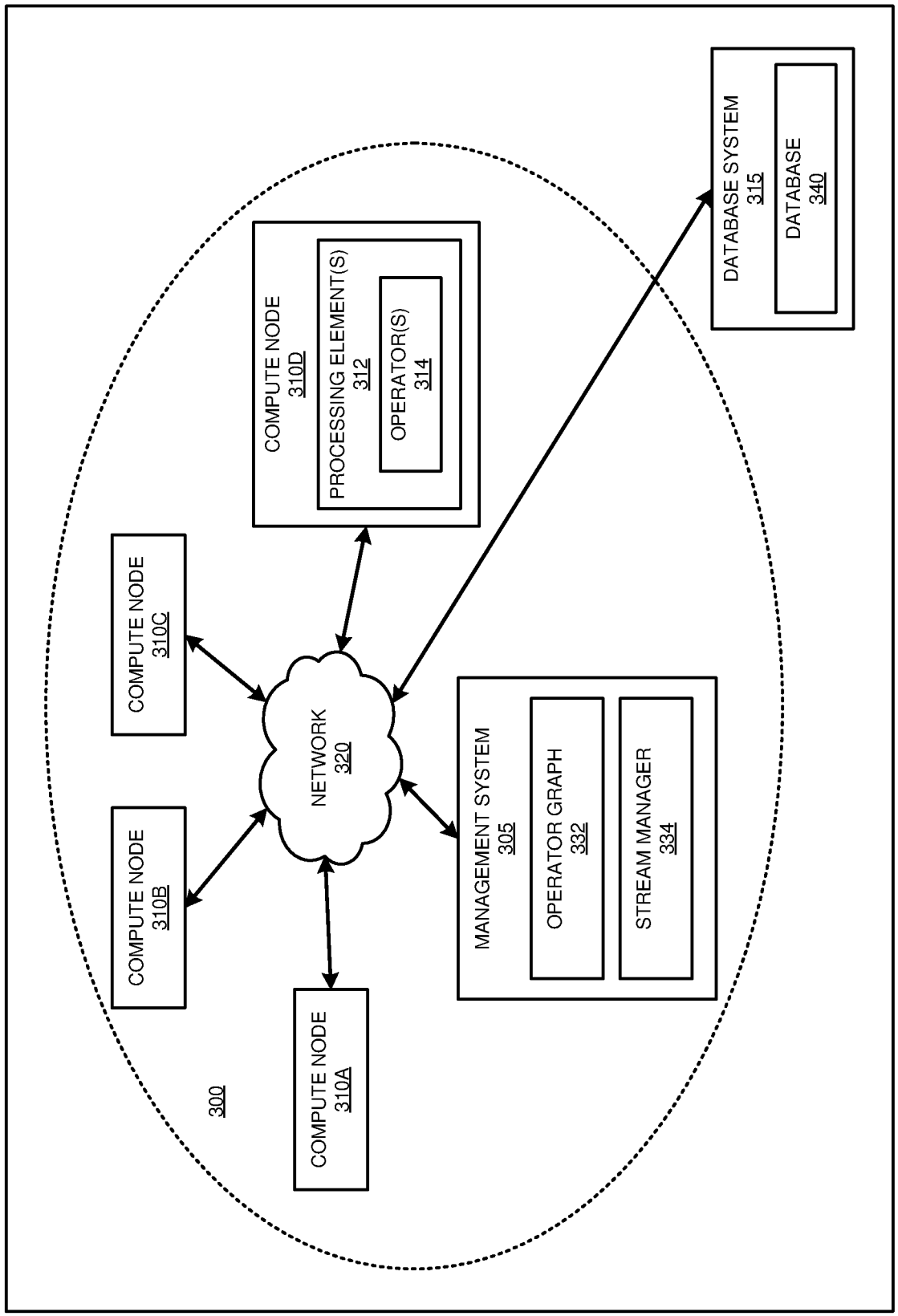
FIG. 3 depicts a block diagram of an example streams application environment in accordance with an illustrative embodiment.

With reference to FIG. 3, this figure depicts a block diagram of an example streams application environment 300 in accordance with an illustrative embodiment. In an embodiment, the streams application environment 300 is configured to execute a streams application, which is an example of application 105A/105B of FIG. 1.

In the illustrated embodiment, the streams application environment 300 includes a management system 305 and a plurality of compute nodes 310A-310D (herein generically referred to as nodes 310)—i.e., hosts—which are communicatively coupled to each other using one or more communications networks 320. In an embodiment, the communications network 320 includes one or more servers, networks, or databases, and uses a communication protocol to transfer data among compute nodes 310. In an embodiment, a database system 315 containing a database 340 is communicatively coupled to network 320 for communication with compute nodes 310. In a particular embodiment, database system 315 is an example of server 106 with database 109 of FIG. 1, and nodes 310A-310D are examples of data processing system 104, clients 110, 112, and 114, and device 132 of FIG. 1.

In the illustrated embodiment, the one or more compute nodes 310A-310D are configured as shown for compute node 310D, such that each of the compute nodes 310A-310D comprise one or more PEs 312, and each PE includes one or more operators 314. Operators 314 are the fundamental building blocks of the streams application, allowing for the streams application to be a distributed computing application. In some embodiments, the compute nodes 310A-310D each run a Linux operating system, and each PE 312 represents a Linux process, and within each Linux process there are operators 314 that run one or more aspects of the streams application such that the streams application is distributed among the operators 314, PEs 312, and compute nodes 310A-310D.

In some embodiments, the management system 305 includes an operator graph 332 and a stream manager 334. In some embodiments, developers using the stream computing service write streaming applications by defining the operator graph 332, which is compiled and submitted to the management system 305.

The stream manager 334 places the operators in the operator graph 332 on one or more PEs on one or more computing nodes, which may include one or more of computing nodes 310A-310D. In some embodiments, the operator graph 332 includes a description of the stream network topology, such as the location, arrangement, connections, and functionality of various operators on nodes 310 of the streams application environment 300.

PEs, such as PE 312, hosts one or more operators, such as operator(s) 314, that operate on incoming tuples, and produces output tuples. A PE has an independent processing unit and runs on a node, such as any of compute nodes 310A-310D. In a stream application, PEs 312 are connected to one another such that data flows from one PE to the next. Data flows from one PE to another in the form of a tuple having a sequence of one or more attributes associated with an entity.

In some embodiments, the stream manager 334 monitors the PEs 312 for degradation and replaces a degrading PE before it fails with a better performing replica of itself. Streaming applications process potentially massive amounts of data in real-time. If a streaming application "falls behind" in its processing, the analysis it is performing may lose its value, i.e. results of the analysis are based on the past, not the most recent data. An application might fall behind simply because of poor performance of one part of the application, such as a single PE. Thus, detecting and replacing a degrading PE before it fails as described herein provides for significant improvements in performance and efficiency for streaming applications.

Figure 4:
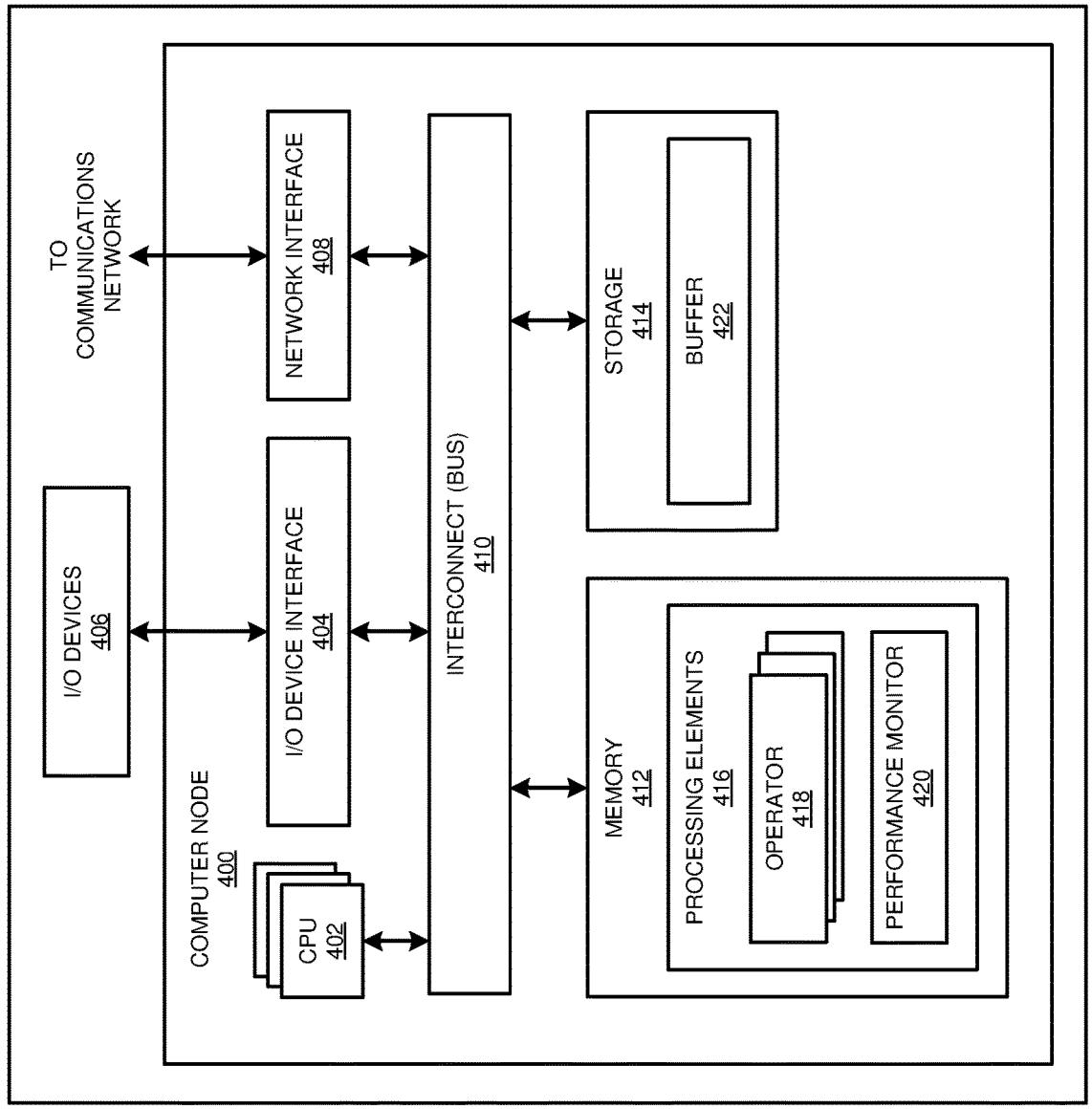
FIG. 4 depicts a block diagram of an example compute node in accordance with an illustrative embodiment.

With reference to FIG. 4, this figure depicts a block diagram of an example compute node 400 in accordance with an illustrative embodiment. In an embodiment, the compute node 400 is an example of the compute nodes 310A-310D of FIG. 3.

In the illustrated embodiment, the compute node 400 includes one or more processors (CPUs) 402, a network interface 408, an interconnect 410, a memory 412, and a storage 414. The compute node 400 may also include an I/O device interface 404 used to connect I/O devices 406, e.g., keyboard, display, and mouse devices, to the compute node 400. In some embodiments, the functionality described herein is distributed among a plurality of systems, which can include combinations of software and/or hardware based systems, for example Application-Specific Integrated Circuits (ASICs), computer programs, or smart phone applications.

In some embodiments, each CPU 402 retrieves and executes programming instructions stored in the memory 412 or storage 414. Similarly, in some embodiments, the CPU 402 stores and retrieves application data residing in the memory 412. In some embodiments, the interconnect 410 transmits programming instructions and application data between each CPU 402, I/O device interface 404, storage 414, network interface 408, and memory 412.

In some embodiments, one or more PEs 416 are stored in the memory 412. In some such embodiments, a PE 416 includes one or more stream operators 418. In some embodiments, a PE 416 is assigned to be executed by only one CPU 402, although in other embodiments the stream operators 418 of a PE 416 include one or more threads that are executed on two or more CPUs 402. The memory 412 is generally included to be representative of a random access memory, e.g., Static Random Access Memory (SRAM), Dynamic Random Access Memory (DRAM), or Flash. The storage 414 includes a buffer 422 and is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data.

In some embodiments, a streams application includes one or more stream operators 418 that are compiled into a PE 416. In some embodiments, the memory 412 includes two or more PEs 416, each PE having one or more stream operators 418. In some embodiments, each stream operator 418 includes a portion of code that processes tuples flowing into a PE and outputs tuples to other stream operators 418 in the same PE, in other PEs, or in both the same and other PEs in a stream computing application. In some embodiments, PEs 416 pass tuples to other PEs that are on the same compute node 400 or on other compute nodes that are accessible via communications networks. For example, in an embodiment, a first PE 416 on a first compute node 400 outputs tuples to a second PE 416 on a second compute node 400.

In some embodiments, the PEs 416 include a performance monitor 420. In some embodiments, the performance monitor 420 monitors the PE 416 for degradation and issues notification signals or data when degradation of the PE 416 is detected. For example, in some embodiments, the performance monitor 420 signals a stream manager (e.g., stream manager 334 of FIG. 3) when the performance monitor 420 detects degradation of performance of the PE 416.

In some embodiments, a performance monitor 420 detects degradation by monitoring the PE 416 for occurrence of a condition that serves as a degradation indicator, which may differ from one PE 416 to another. In some embodiments, the thresholds for degradation indicator conditions may differ from one PE 416 to another. Thus, in some such embodiments, a degradation indicator condition is configurable for each PE 416. In some embodiments, a degradation indicator condition includes execution conditions associated with the PE 416 that deviates from a predefined or expected pattern. For example, in some embodiments, indicators of degradation include abnormal amounts of queued tuples (i.e. tuples waiting to be processed on input ports of operators in the PE), abnormal memory usage, number and types of exceptions handled, and abnormal CPU consumption. In some embodiments, the performance monitor 420 monitors the PE 416 and maintaining statistics that represent the normal or expected performance of the PE 416. In some embodiments, a performance monitor 420 logs the utilization of such computing resources by the PE 416, allowing for normal utilization patterns to be established and also allowing for abnormal utilization patterns to be detected. In some embodiments, abnormal amounts of queued tuples includes higher than normal amounts of queued tuples. In some embodiments, abnormal memory usage includes abnormally high rates of change in memory usage. In some embodiments, abnormal CPU consumption includes abnormally high rates of change in CPU consumption.

Figure 5:
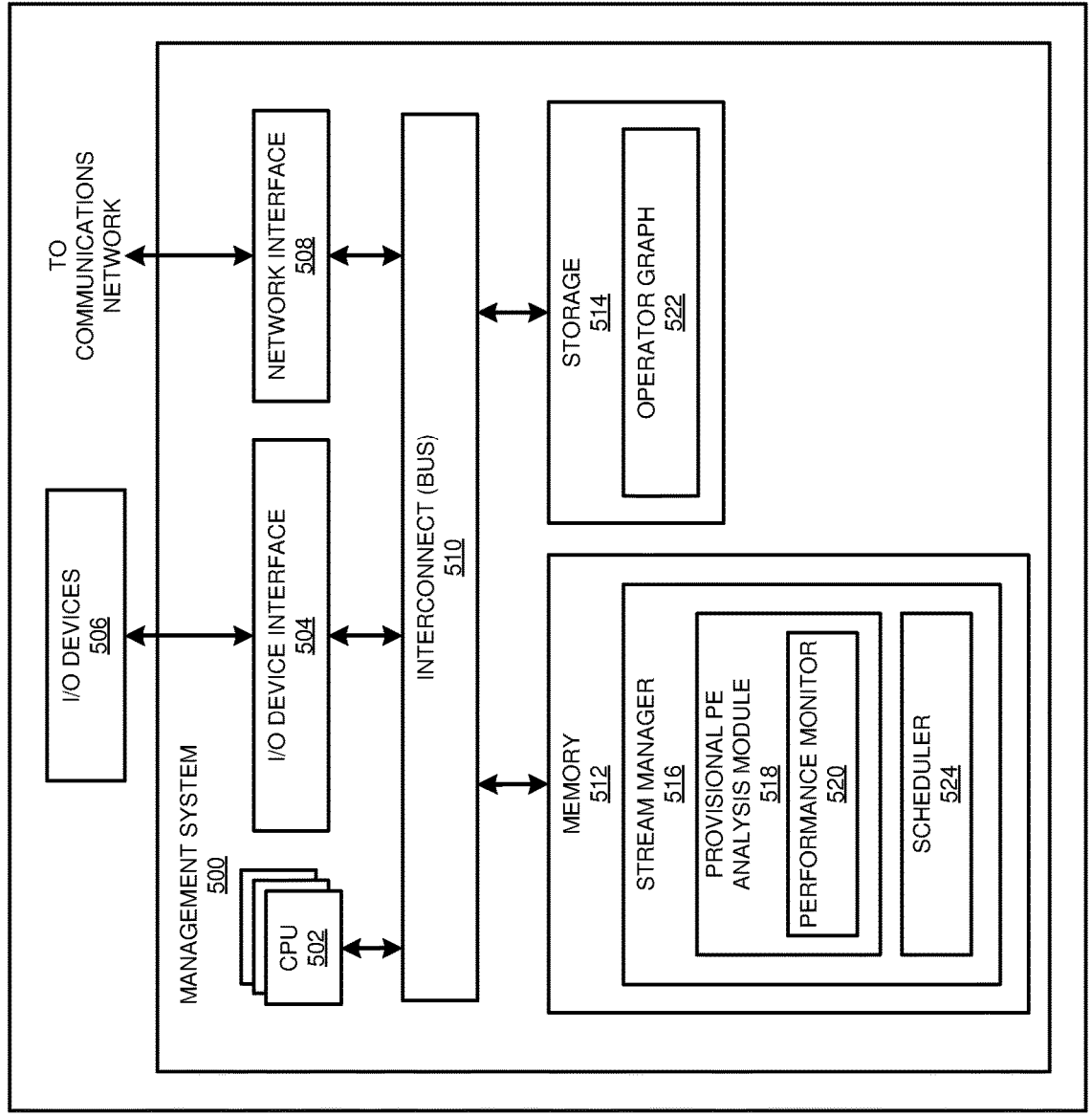
FIG. 5 depicts a block diagram of an example management system in accordance with an illustrative embodiment.

With reference to FIG. 5, this figure depicts a block diagram of an example management system 500 in accordance with an illustrative embodiment. In an embodiment, the management system 500 is an example of the management system 305 of FIG. 3.

In the illustrated embodiment, the management system 500 includes one or more processors (CPUs) 502, a network interface 508, an interconnect 510, a memory 512, and a storage 514. The management system 500 may also include an I/O device interface 504 connecting I/O devices 506, e.g., keyboard, display, and mouse devices, to the management system 500. In some embodiments, the functionality described herein is distributed among a plurality of systems, which can include combinations of software and/or hardware based systems, for example Application-Specific Integrated Circuits (ASICs), computer programs, or smart phone applications.

In some embodiments, each CPU 502 retrieves and executes programming instructions stored in the memory 512 or storage 514. Similarly, in some embodiments, each CPU 502 stores and retrieves application data residing in the memory 512 or storage 514. The interconnect 510 is used to move data, such as programming instructions and application data, between the CPU 502, I/O device interface 504, storage unit 514, network interface 508, and memory 512. The storage 514 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. In some embodiments, the network interface 508 is configured to transmit data via the communications network.

In some embodiments, the memory 512 stores a stream manager 516. Additionally, in some such embodiments, the storage 514 stores an operator graph 522 that defines how tuples are routed to PEs for processing. In the illustrated embodiment, the stream manager 516 also contains a provisional PE analysis module 518 and a scheduler 524. In the illustrated embodiment, the provisional PE analysis module 518 includes a performance monitor 520.

In some embodiments, the analysis module 518 monitors the PEs for degradation and replaces a degrading PE before it fails with a better performing replica of itself. Streaming applications process potentially massive amounts of data in real-time. If a streaming application "falls behind" in its processing, the analysis it is performing may lose its value, i.e. results of the analysis are based on the past, not the most recent data. An application might fall behind simply because of poor performance of one part of the application, such as a single PE. Thus, detecting and replacing a degrading PE before it fails as described herein provides for significant improvements in performance and efficiency for streaming applications.

In some embodiments, the performance monitor 520 monitors a streaming application, maintaining statistics that represent the performance of the various PEs that make up the streaming application. In some embodiments, the performance monitor 520 is part of the stream manager 516 as shown. In other embodiments, the performance monitor 520 is invoked at runtime, but may be a separate entity from the runtime stream manager 516.

In some embodiments, the performance monitor 520 monitors PEs for degradation and issues notification signals or data when degradation of one or more PEs is detected. For example, in some embodiments, the performance monitor 520 signals the stream manager 516 when the performance monitor 520 detects degradation of performance of a PE.

In some embodiments, a performance monitor 520 detects degradation by monitoring the PEs for occurrence of a condition that serves as a degradation indicator, which may differ from one PE 416 to another. In some embodiments, the thresholds for degradation indicator conditions may differ from one PE 416 to another. Thus, in some such embodiments, a degradation indicator condition is configurable for each PE 416. In some embodiments, a degradation indicator condition includes execution conditions associated with a PE that deviates from a predefined or expected pattern. For example, in some embodiments, indicators of degradation include abnormal amounts of queued tuples (i.e. tuples waiting to be processed on input ports of operators in the PE), abnormal memory usage, number and types of exceptions handled, and abnormal CPU consumption. In some embodiments, the performance monitor 520 monitors PEs and maintaining statistics that represent the normal or expected performance of the PEs. In some embodiments, a performance monitor 520 logs the utilization of such computing resources by the PEs, allowing for normal utilization patterns to be established and also allowing for abnormal utilization patterns to be detected. In some embodiments, abnormal amounts of queued tuples includes higher than normal amounts of queued tuples. In some embodiments, abnormal memory usage includes abnormally high rates of change in memory usage. In some embodiments, abnormal CPU consumption includes abnormally high rates of change in CPU consumption.

In some embodiments, the analysis module 518 analyzes a PE identified by the performance monitor 520 as exhibiting one or more indications of degradation. In some embodiments, the analysis module 518 analyzes the PE to determine whether the indications identified by the performance monitor 520 are actually indications of a problem other than degradation of the PE, such as backpressure or one or more cluster computing resources reaching capacity. In some such embodiments, if the analysis module 518 does not detect a problem other than degradation of the PE, the analysis module 518 next evaluates the PE using a provisional PE. In some such embodiments, the analysis module 518 uses the scheduler 524 to identify a node to host the provisional PE. In some embodiments, the scheduler 524 searches for a node other than the node hosting the PE. In some embodiments, the scheduler 524 also searches for a node based on predetermined rules or criteria, for example availability of computing resources and vicinity to upstream and downstream PEs.

In some embodiments, once the scheduler 524 identifies a host node, the analysis module 518 starts the provisional PE on the identified node at runtime while maintaining runtime operation of the PE. In some such embodiments, the provisional PE is connected to the same upstream PE as the PE under analysis so that the provisional PE and the PE under analysis both receive the same stream of tuples from the same upstream PE at the same time. In some such embodiments, the provisional PE and the PE under analysis both perform the same defined process on the stream of tuples. In some such embodiments, the PE under analysis performs the defined process on the stream of tuples resulting in an output stream of tuples that the PE transmits to a downstream PE, while the output of the provisional PE is not connected to any downstream elements.

In some embodiments, the analysis module 518 compares operation of the PE under analysis to operation of the provisional PE based on a performance metric associated with one or more computing resources. In some such embodiments, if the analysis module 518 determines that the provisional PE is performing better than the PE under analysis, then the analysis module 518 replaces the PE under analysis with the provisional PE, for example by connecting the output of the provisional PE to the downstream PE in place of the PE under analysis, which is then shut down.

Figure 6:
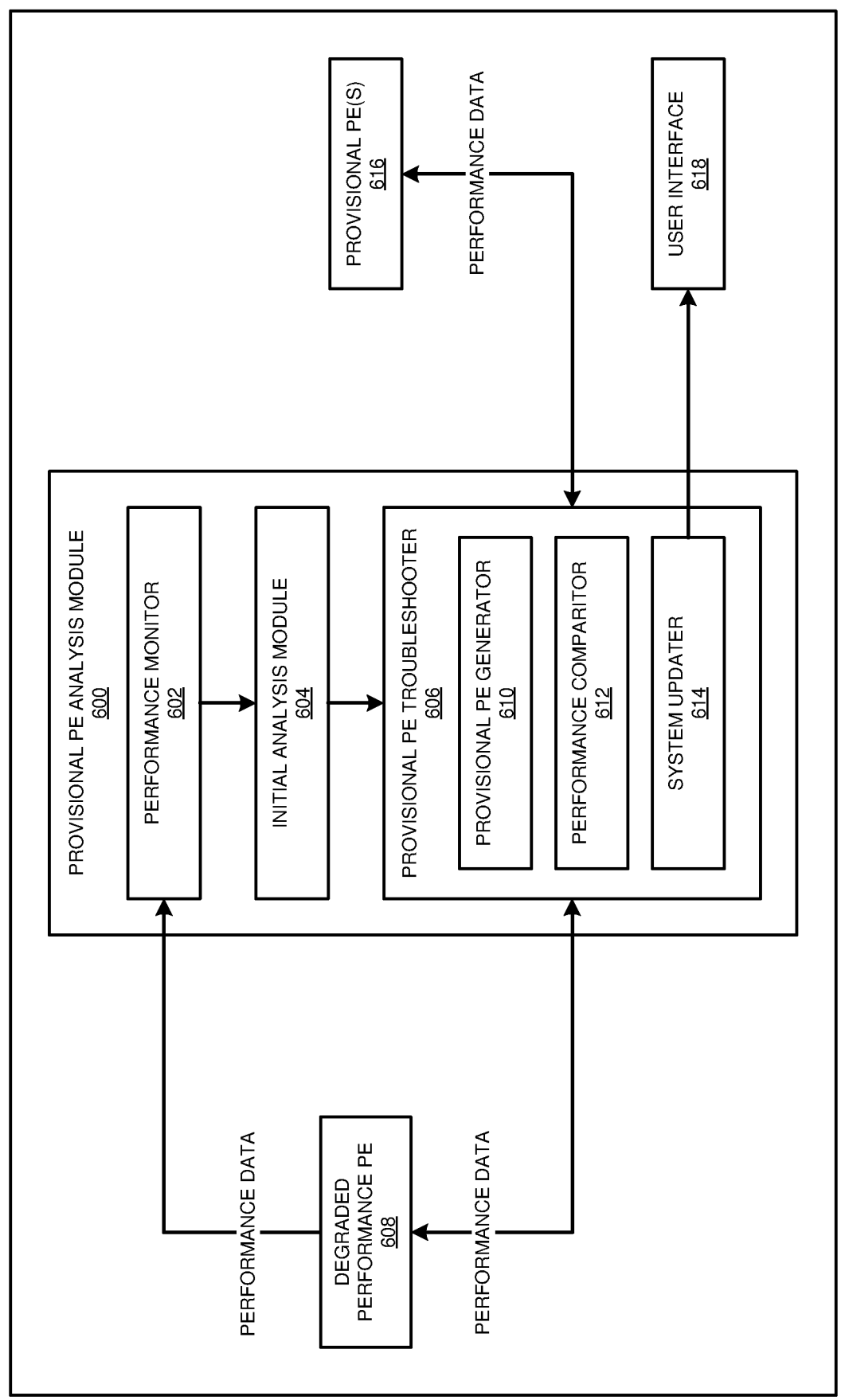
FIG. 6 depicts a block diagram of an example provisional PE (PE) analysis module in accordance with an illustrative embodiment.

With reference to FIG. 6, this figure depicts a block diagram of an example provisional PE analysis module 600 in accordance with an illustrative embodiment. In an embodiment, the provisional PE analysis module 600 is an example of the provisional PE analysis module 518 of FIG. 5.

In the illustrated embodiment, the provisional PE analysis module 600 includes a performance monitor 602, an initial analysis module 604, and a provisional troubleshooter 606. In the illustrated embodiment, the provisional troubleshooter 606 includes a provisional PE generator 610, a performance comparator 612, and a system updater 614. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the performance monitor 602 monitors a streaming application, maintaining statistics that represent the performance of the various PEs that make up the streaming application. In some embodiments, the performance monitor 602 monitors PEs for degradation and issues notification signals or data when degradation of one or more PEs is detected. For example, in some embodiments, the performance monitor 602 signals the initial analysis module 604 when the performance monitor 602 detects degradation of performance of a PE, such as degraded performance PE 608 shown in FIG. 6.

In some embodiments, the performance monitor 602 detects degradation of the degraded performance PE 608 by monitoring the degraded performance PE 608 for occurrence of a condition that serves as a degradation indicator, which may differ from one PE to another. In some embodiments, the thresholds for degradation indicator conditions may also differ from one PE to another. Thus, in some such embodiments, a degradation indicator condition is configurable for each PE. In some embodiments, a degradation indicator condition includes execution conditions associated with a PE that deviates from a predefined or expected pattern. For example, in some embodiments, indicators of degradation include abnormal amounts of queued tuples (i.e. tuples waiting to be processed on input ports of operators in the PE), abnormal memory usage, number and types of exceptions handled, and abnormal CPU consumption. In some embodiments, the performance monitor 602 monitors a plurality of PEs, including degraded performance PE 608. In alternative embodiments, the performance monitor 602 only monitors degraded performance PE 608. In some embodiments, performance monitor 602 maintains statistics that represent the normal or expected performance of the degraded performance PE 608 prior to degradation of PE 608. In some embodiments, the performance monitor 602 logs the utilization of such computing resources by the degraded performance PE 608, allowing for normal utilization patterns to be established and thereby also allowing for abnormal utilization patterns to be detected. In some embodiments, abnormal amounts of queued tuples includes higher than normal amounts of queued tuples. In some embodiments, abnormal memory usage includes abnormally high rates of change in memory usage. In some embodiments, abnormal CPU consumption includes abnormally high rates of change in CPU consumption.

In some embodiments, the initial analysis module 604 analyzes degraded performance PE 608 upon it being identified by the performance monitor 602 as exhibiting one or more indications of degradation. In some embodiments, the initial analysis module 604 analyzes the degraded performance PE 608 to determine whether the indications identified by the performance monitor 602 are actually indications of a problem other than degradation of the degraded performance PE 608, such as backpressure or one or more cluster computing resources reaching capacity.

In some such embodiments, if the initial analysis module 604 does not detect a problem other than degradation of the degraded performance PE 608, the initial analysis module 604 notifies the provisional troubleshooter 606, which next evaluates the degraded performance PE 608 using a provisional PE 616. In some such embodiments, the provisional troubleshooter 606 communicates with a scheduler (e.g., scheduler 524 of FIG. 5) to identify a node to host the provisional PE 616. In some embodiments, the scheduler searches for a node other than the node hosting the PE. In some embodiments, the scheduler also searches for a node based on predetermined rules or criteria, for example availability of computing resources and vicinity to upstream and downstream PEs. In some embodiments, once the scheduler identifies a host node, the scheduler notifies the provisional PE generator 610. The provisional PE generator 610 starts the provisional PE 616 on the identified node at runtime while maintaining runtime operation of the degraded performance PE 608. In some such embodiments, provisional PE generator 610 connects an upstream side of the provisional PE 616 to the same upstream PE as the degraded performance PE 608 so that the provisional PE 616 and the degraded performance PE 608 both receive the same stream of tuples from the same upstream PE at the same time. In some such embodiments, the provisional PE 616 and the degraded performance PE 608 both perform the same defined process on the stream of tuples, which allows for comparison of the performance of the degraded performance PE 608 to that of the provisional PE 616 by the performance comparator 612. In some such embodiments, the degraded performance PE 608 performs the defined process on the stream of tuples resulting in an output stream of tuples that the degraded performance PE 608 transmits to a downstream PE, while the output of the provisional PE 616 is not connected to any downstream elements.

In some embodiments, the performance comparator 612 compares the operation of the degraded performance PE 608 to that of the provisional PE 616 based on a performance metric associated with one or more computing resources. For example, in some embodiments, the performance comparator 612 compares the operation of the degraded performance PE 608 to that of the provisional PE 616 by comparing one or more of CPU usage, memory usage, and speed of tuple through-put. In some such embodiments, if the performance comparator 612 determines that the provisional PE 616 is performing better than the degraded performance PE 608, then the performance comparator 612 notifies the system updater 614. Responsive to the notification by the performance comparator 612 that the provisional PE 616 is performing better than the degraded performance PE 608, the system updater 614 replaces the degraded performance PE 608 with the provisional PE 616, for example by connecting the output of the provisional PE 616 to the downstream PE in place of the degraded performance PE 608, and the system updater 614 shuts down the degraded performance PE 608. In some embodiments, the system updater 614 sends a notification to the user via a user interface 618 regarding the replacement of the degraded performance PE 608 with the provisional PE 616.

Figure 7:
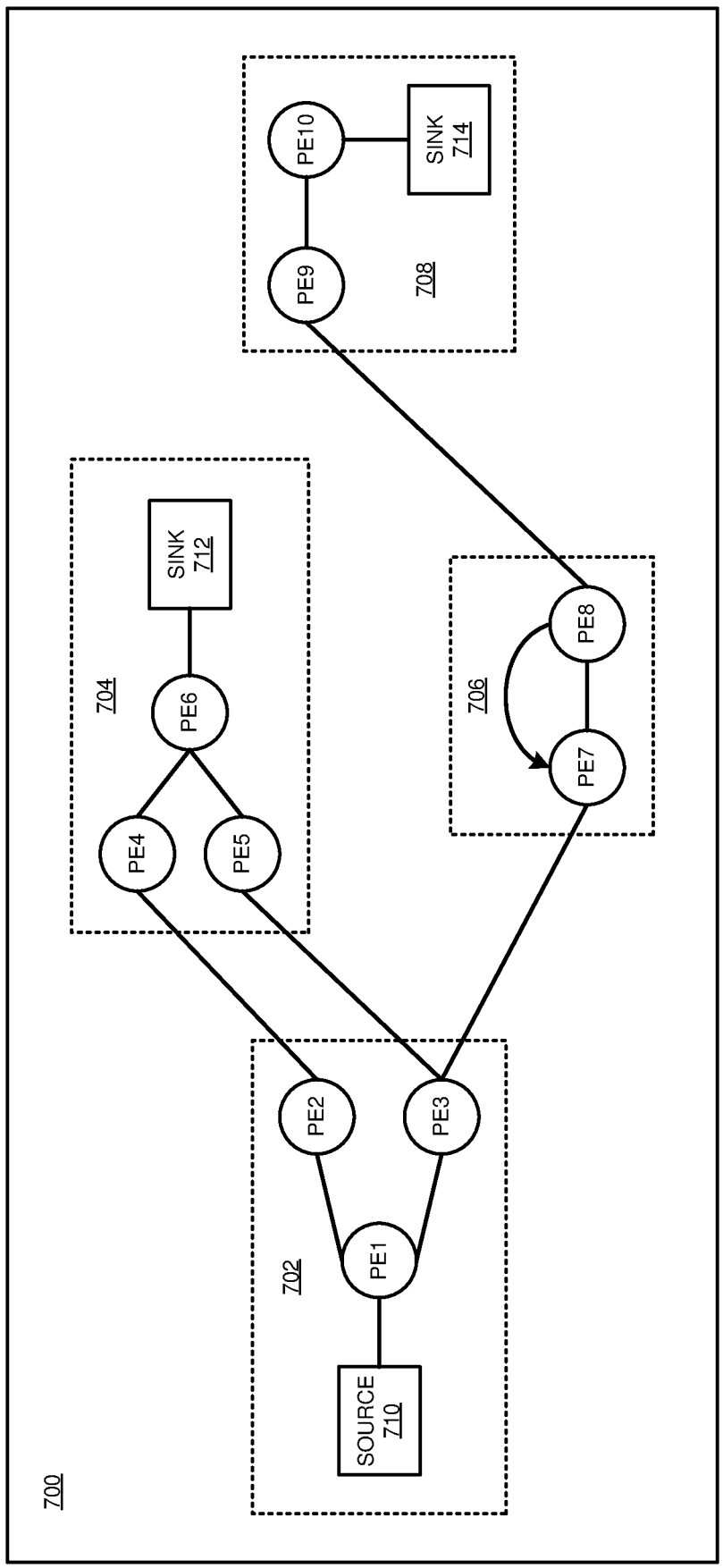
FIG. 7 depicts a block diagram of an operator graph for a stream computing application in accordance with an illustrative embodiment.

With reference to FIG. 7, this figure block diagram of an operator graph 700 for a stream computing application in accordance with an illustrative embodiment. The operator graph shown in FIG. 7 is shown for clarity purposes as a non-limiting example of a streaming application that can benefit from disclosed embodiments.

In the illustrated embodiment, the operator graph 700 is a graph for a stream computing application beginning from one or more sources 710 through to one or more sinks 712, 714. This flow from source to sink may also be generally referred to herein as an execution path. Although FIG. 7 is abstracted to show connected PEs PE1-PE10, the operator graph 700 may include data flows between stream operators (e.g., operator 314 of FIG. 3) within the same or different PEs. Typically, PEs receive tuples from the stream as well as output tuples into the stream (except for a sink—where the stream terminates, or a source—where the stream begins).

In the illustrated embodiment, the operator graph 700 includes ten PEs (labeled as PE1-PE10) running on the compute nodes 702, 704, 706, and 708. In some embodiments, a PE includes one or more stream operators fused together to form an independently running process with its own process ID (PID) and memory space. In embodiments where two (or more) PEs are running independently, inter-process communication may occur using a "transport," e.g., a network socket, a TCP/IP socket, or shared memory. However, when stream operators are fused together, the fused stream operators can use more rapid communication techniques for passing tuples among stream operators in each PE.

The operator graph 700 begins at a source 710 and ends at a sink 712, 714. Compute node 702 includes the PEs PE1, PE2, and PE3. Source 710 flows into the PE PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 704. Likewise, the tuples output by PE4 flow to operator sink PE6 712. Similarly, tuples flowing from PE3 to PE5 also reach the operators in sink PE6 712. Thus, in addition to being a sink for this example operator graph, PE6 could be configured to perform a join operation, combining tuples received from PE4 and PE5. This example operator graph also shows tuples flowing from PE3 to PE7 on compute node 706, which itself shows tuples flowing to PE8 and looping back to PE7. Tuples output from PE8 flow to PE9 on compute node 708, which in turn outputs tuples to be processed by operators in a sink PE, for example PE10 714.

In some embodiments, a tuple received by a particular PE is generally not considered to be the same tuple that is output downstream because the output tuple is changed in some way. For example, in some embodiments, an attribute or metadata is added, deleted, or changed. However, some embodiments include a PE that does not change an output tuple from the input tuple in any way. Generally, a particular tuple output by a PE may not be considered to be the same tuple as a corresponding input tuple even if the input tuple is not changed by the PE. However, to simplify the present description and the claims, an output tuple that has the same data attributes as a corresponding input tuple may be referred to herein as the same tuple. In the illustrated embodiment, a performance monitor as described herein is configured to monitor one or more of PEs PE1-PE10 for degraded performance.

Figure 8:
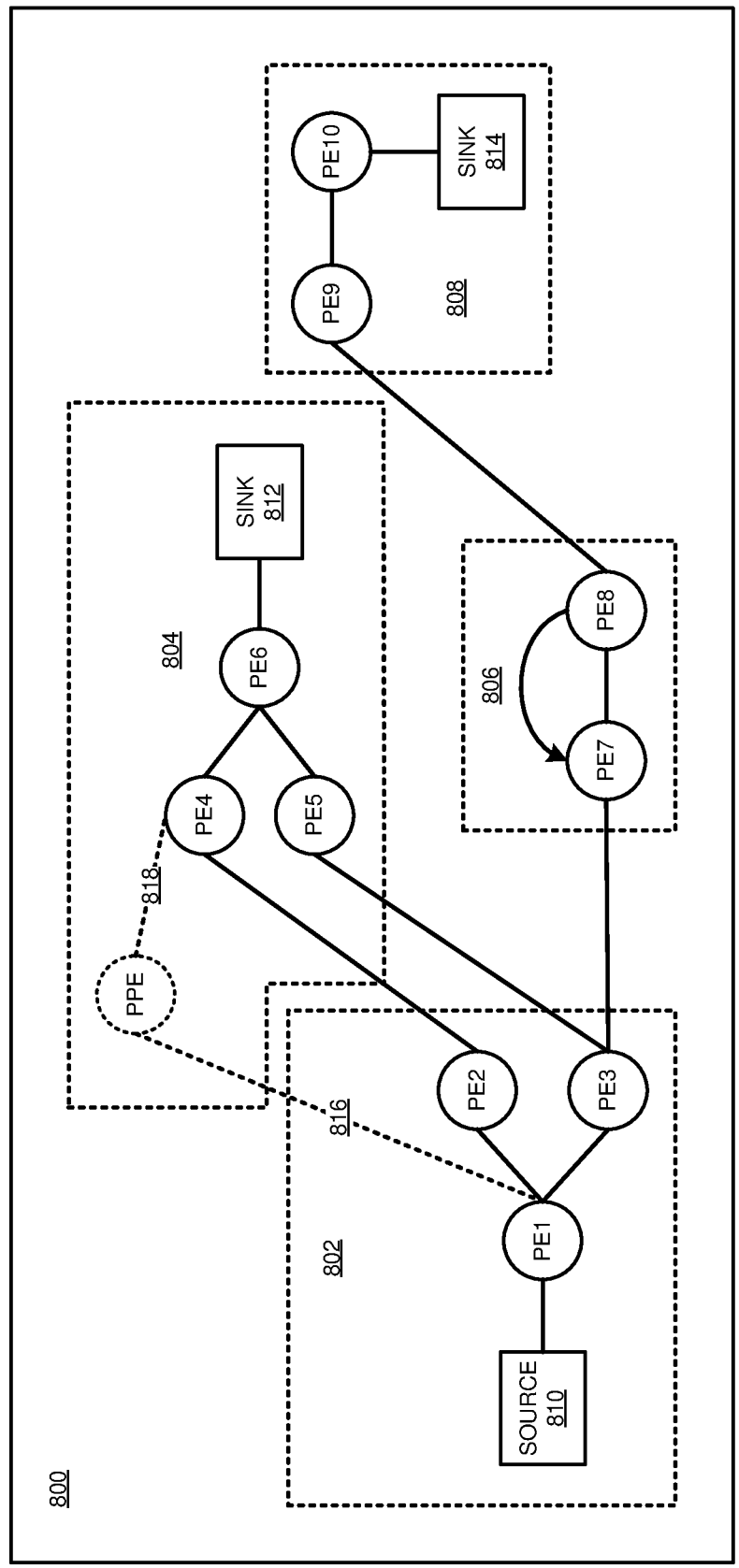
FIG. 8 depicts a block diagram of an operator graph for a stream computing application having a provisional PE in accordance with an illustrative embodiment.

With reference to FIG. 8, this figure depicts a block diagram of an operator graph 800 for a stream computing application having a provisional PE in accordance with an illustrative embodiment. The operator graph shown in FIG. 8 is shown for clarity purposes as a non-limiting example of a modified version of the operator graph 700 of FIG. 7 that begins at a source 810 and ends at a sink 812, 814 that can benefit from disclosed embodiments.

In the illustrated example, a performance monitor (e.g., performance monitor 520 of FIG. 5 or performance monitor 602 of FIG. 6) detects degradation of PE2 by monitoring the PE2 and detecting that execution conditions associated with PE2 deviates from a predefined or expected pattern. For example, in some embodiments, the performance monitor detects indicators of degradation including abnormal amounts of queued tuples (i.e. tuples waiting to be processed on input ports of operators in the PE), abnormal memory usage, number and types of exceptions handled, and/or abnormal CPU consumption. In the illustrated example, a problem other than degradation has not been detected, so a provisional PE (designated PPE in FIG. 8) is started on a different node: since PE2 is on node 802, PPE is located on node 804, but could alternatively have been started on node 806 or node 808.

The provisional PE is started at runtime while maintaining runtime operation of PE2. Initially, for purposes of comparing performance of the provisional PE to PE2, the provisional PE is only connected on its upstream side via edge 816 to PE1 so that the provisional PE and PE2 both receive the same stream of tuples from the same upstream PE1 at the same time and both perform the same defined process on the stream of tuples, which allows for comparison of the performance of the provisional PE to that of PE2.

In the illustrated example, a performance comparator or streams manger compares the operation of the provisional PE to that of PE2 based on a performance metric associated with one or more computing resources. For example, in some embodiments, the provisional PE and PE2 are compared based on one or more of CPU usage, memory usage, and/or speed of tuple through-put. In some such embodiments, if the provisional PE performs better than PE2, then provisional PE replaces PE2, for example by connecting the output/downstream side of the provisional PE to the downstream PE4 of PE2 in place of PE2, for example by connecting edge 818 from the provisional PE to PE4 and shutting down PE2.

Figure 9:
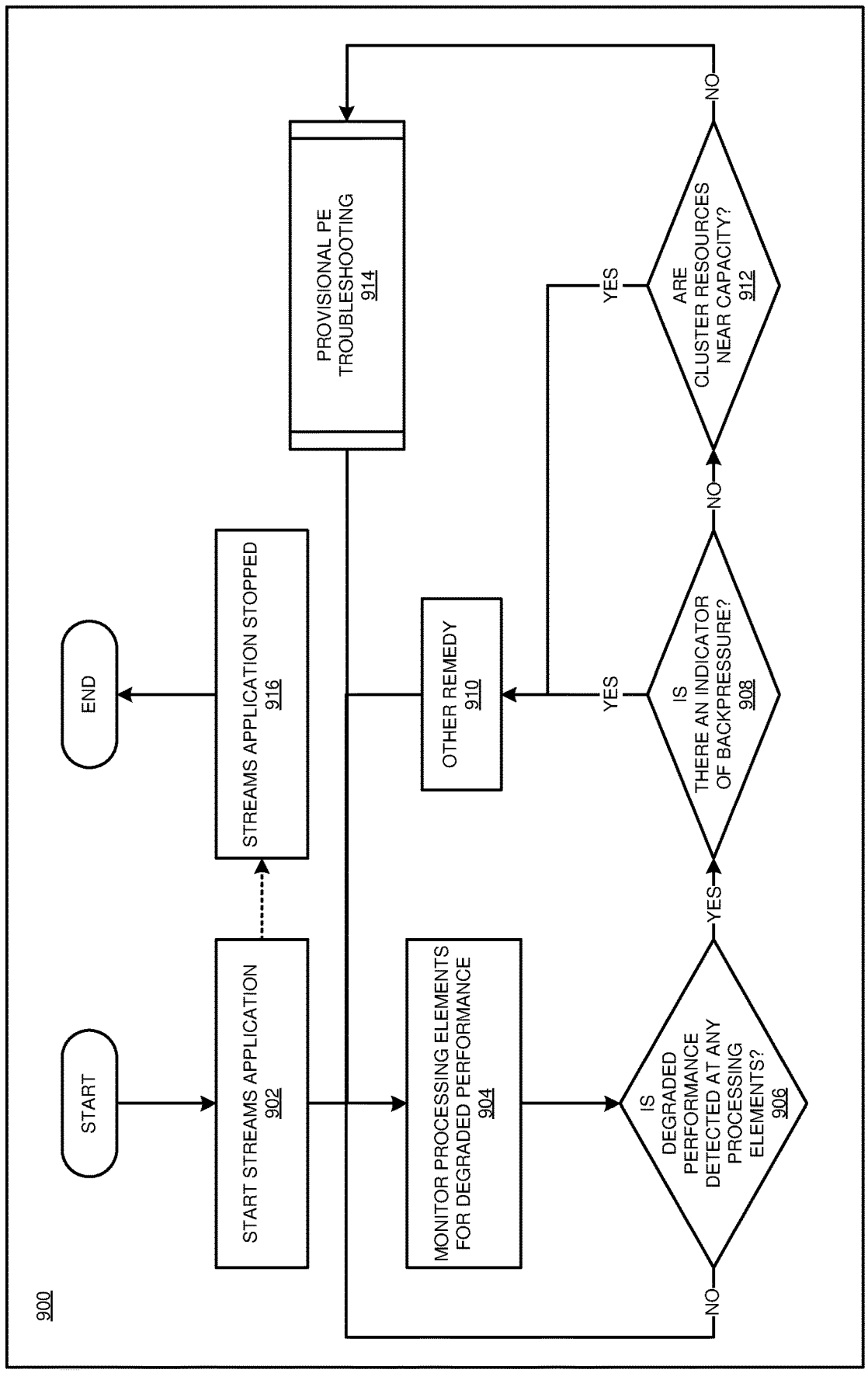
FIG. 9 depicts a flowchart of an example dynamic PE replacement process in accordance with an illustrative embodiment.

With reference to FIG. 9, this figure depicts a flowchart of an example dynamic PE replacement process 900 in accordance with an illustrative embodiment. In a particular embodiment, the provisional PE analysis module 600 in FIG. 6 carries out the process 900.

In an embodiment, at block 902, the process 900 starts a streams application. Next, at block 904, the process 900 monitors processing elements for degraded performance. Next, at block 906, the process 900 checks whether degraded performance has been detected at any processing elements. If not, the process 900 returns to block 904 to continue monitoring. Otherwise, the process 900 continues to block 908, where the process 900 begins evaluation of the degraded PE. At block 908, the process 900 checks the degraded PE for an indication that backpressure is the cause of the degraded performance, followed by block 912, where the process 900 checks the operating levels of computing resources of the cluster of nodes in which the degraded PE is deployed. If the process 900 detects backpressure or a lack of available or sufficient cluster computing resources as being likely to be the cause of the degradation of the degraded PE, the process proceeds to block 910, where the process applies other remedies known in the art to address the backpressure and/or lack of cluster computing resources. Otherwise, the process continues to block 914, where the process 900 performs a provisional PE troubleshooting process, for example according to the process 1000 of FIG. 10, the process 1100 of FIG. 11, the process 1200 of FIG. 12, or a process that combines portions of two or more of process 1000, 1100, and/or 1200.

After the provisional PE troubleshooting process at block 914, the process 900 returns to block 904 to continue monitoring processing elements for degraded performance. In the illustrated embodiment, the monitoring continues until another degraded PE is discovered or until the streams application stops as indicated at block 916, after which the process 900 ends.

Figure 10:
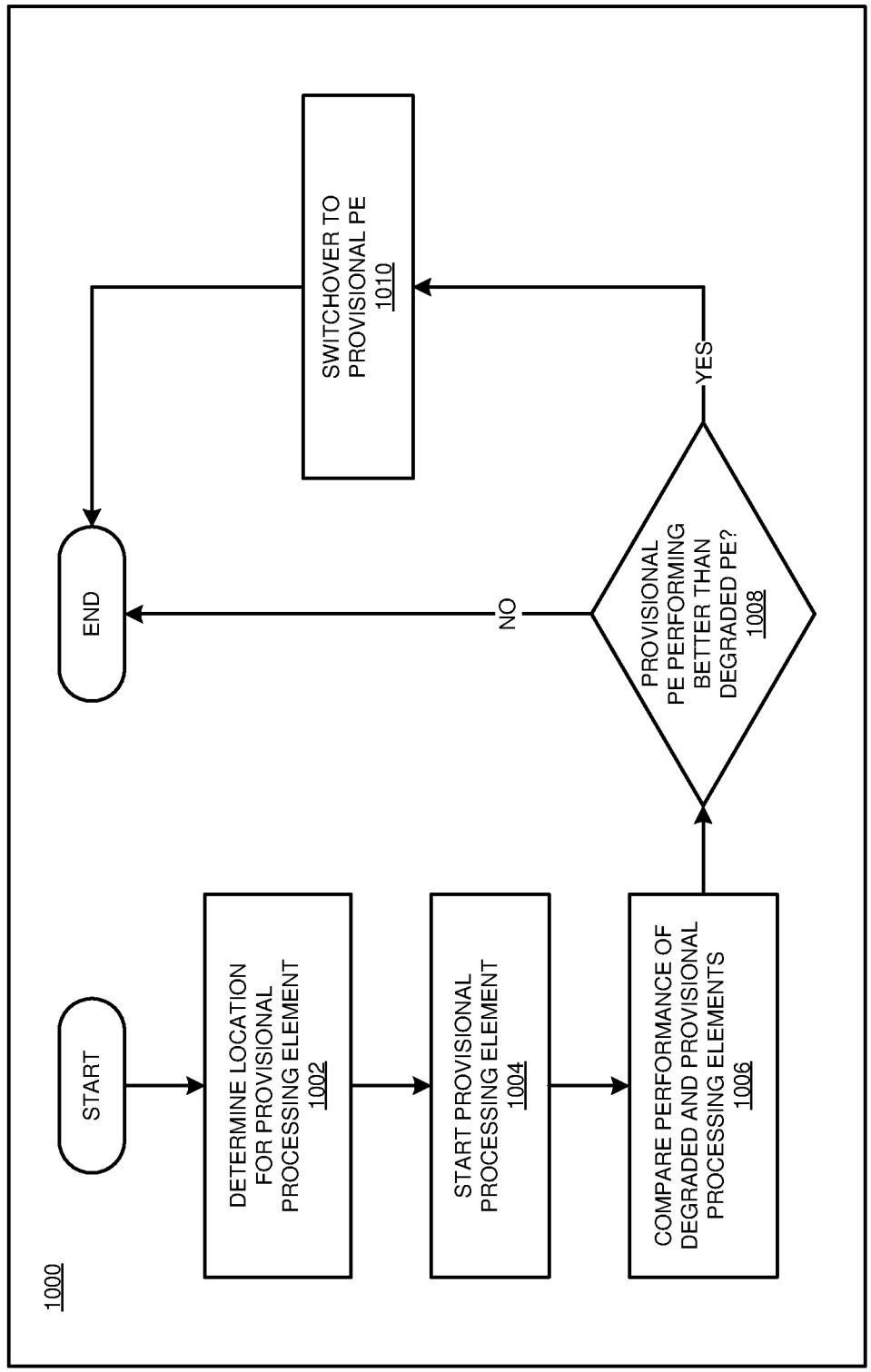
FIG. 10 depicts a flowchart of an example provisional PE troubleshooting process in accordance with an illustrative embodiment.

With reference to FIG. 10, this figure depicts a flowchart of an example dynamic PE replacement process 1000 in accordance with an illustrative embodiment. In a particular embodiment, the provisional PE analysis module 600 in FIG. 6 carries out the process 1000. In an embodiment, the process 1000 is an example of the provisional PE troubleshooting process at block 914 of FIG. 9.

In the illustrated embodiment, the process 1000 tests the use of a provisional processing element as a possible replacement for a degrading PE. At block 1002, the process 1000 determines a location for a provisional PE. In some embodiments, the process 1000 uses a scheduler to identify a node on which to deploy the provisional PE. In some such embodiments, the scheduler determines a best node to run the provisional PE. In some such embodiments, the scheduler excludes the node on which the degrading PE is running when determining a best node to run the provisional PE.

Next, at block 1004, the process 1000 starts the provisional PE on the node selected at block 1002. In some embodiments, the provisional PE is started at runtime while maintaining runtime operation of the degrading PE. In some embodiments, the provisional PE is only connected on its upstream side, and is connected to the immediate next upstream PE of the degrading PE. This connection results in both the provisional PE and the degrading PE receiving the same stream of tuples from the same upstream PE at the same time.

Next, at block 1006, the process 1000 compares the performance of the degraded PE and the provisional PE. In some such embodiments, the provisional PE performs the same defined processing on the stream of tuples as the degrading PE, which allows for a performance-based comparison of the provisional PE and the degrading PE. In some embodiments, a performance comparator or streams manger compares the operation of the provisional PE to that of the degrading PE based on a performance metric associated with one or more computing resources. For example, in some embodiments, the provisional PE and the degrading PE are compared based on one or more of CPU usage, memory usage, and/or speed of tuple through-put.

Next, at block 1008, the process 1000 determines whether the performance of the provisional PE is better than the performance of the degraded PE. In some such embodiments, if the provisional PE performs better than the degraded PE, then at block 1010 the process 1000 performs a switchover to the provisional PE as a replacement for the degrading PE, and the degrading PE is shut down. In some embodiments, the switchover includes connecting the output/downstream side of the provisional PE to the next immediate downstream PE of the degrading PE.

Figure 11:
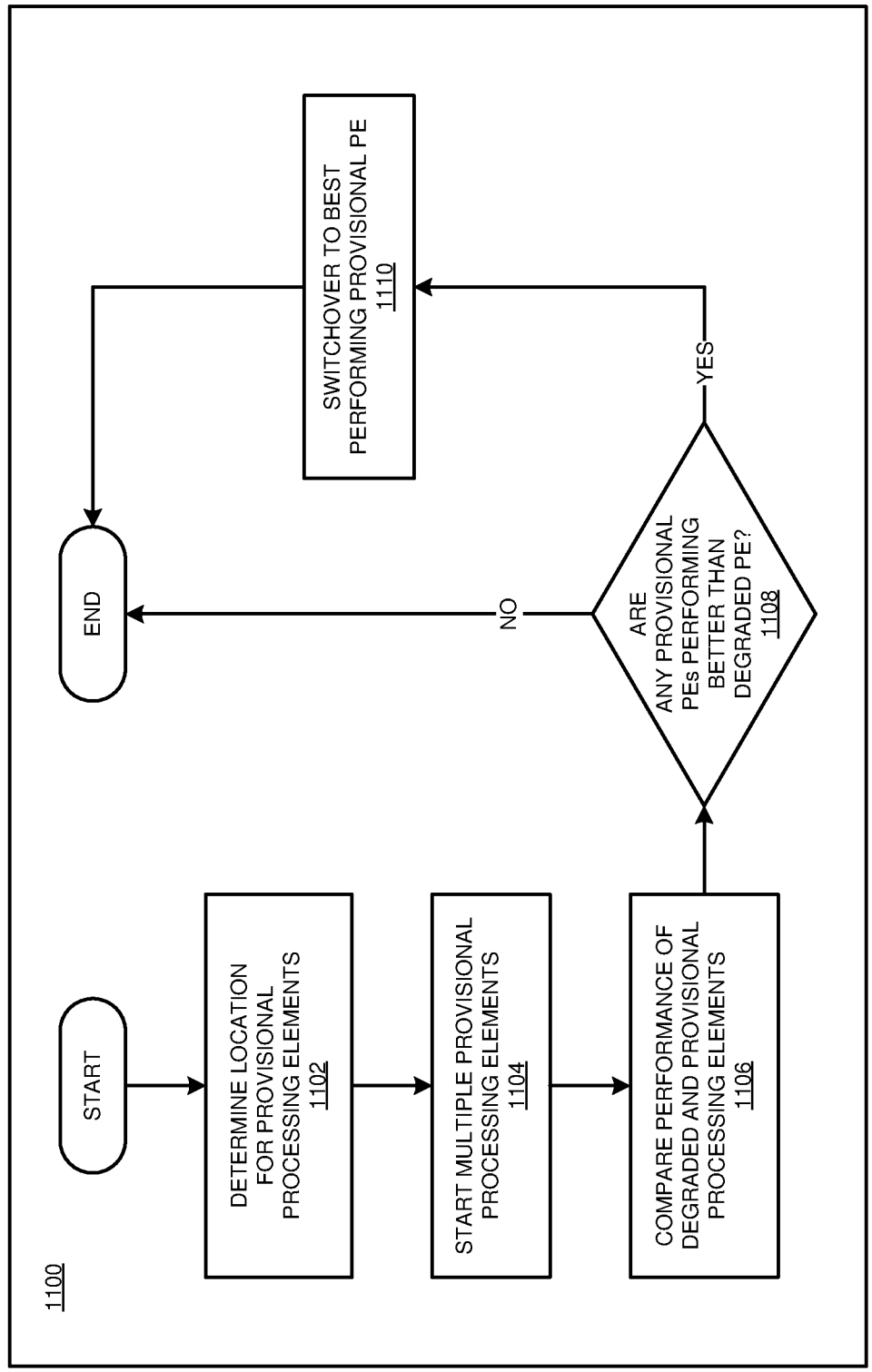
FIG. 11 depicts a flowchart of an example provisional PE troubleshooting process in accordance with an illustrative embodiment.

With reference to FIG. 11, this figure depicts a flowchart of an example dynamic PE replacement process 1100 in accordance with an illustrative embodiment. In a particular embodiment, the provisional PE analysis module 600 in FIG. 6 carries out the process 1100. In an embodiment, the process 1100 is an example of the provisional PE troubleshooting process at block 914 of FIG. 9.

In the illustrated embodiment, the process 1100 tests the use of a plurality of provisional processing elements as possible replacements for a degrading PE. In some embodiments, the number of provisional PEs is a fixed predetermined value. In some embodiments, the number of provisional PEs is a user-configurable value that is initially set to a default value and is adjustable by user inputs. In some embodiments, the process 1100 determines the number of provisional PEs to use based on any number of implementation-specific factors, for example the type of degrading PE being replicated (i.e., the operations performed by one or more operators on the degrading PE), the size of the streams application, the number of available nodes already being used by the streams application, and/or any other desired factors.

At block 1102, the process 1100 determines locations for each of the plurality of provisional PEs. In some embodiments, the process 1100 uses a scheduler to identify nodes on which to deploy the provisional PEs. In some such embodiments, the scheduler determines a list of best nodes to run the provisional PEs. In some embodiments, the scheduler also determines the number of provisional PEs to deploy, for example based on availability of nodes on which the deploy the provisional PEs. In some such embodiments, the scheduler excludes the node on which the degrading PE is running when determining best nodes to run the provisional PEs.

Next, at block 1104, the process 1100 starts the provisional PEs on the respective node selected at block 1102. In some embodiments, the provisional PEs are started at runtime while maintaining runtime operation of the degrading PE. In some embodiments, the provisional PEs are only connected on their upstream sides, and are all connected to the immediate next upstream PE of the degrading PE. This connection results in both the degrading PE and the set of provisional PEs receiving the same stream of tuples from the same upstream PE at the same time.

Next, at block 1106, the process 1100 compares the performance of the degraded PE and the provisional PEs. In some such embodiments, the provisional PEs each perform the same defined processing on the stream of tuples as the degrading PE, which allows for a performance-based comparison of the degrading PE to the provisional PEs. In some embodiments, a performance comparator or streams manger compares the operation of the degrading PE to that of the provisional PEs based on a performance metric associated with one or more computing resources. For example, in some embodiments, the provisional PEs and the degrading PE are compared based on one or more of CPU usage, memory usage, and/or speed of tuple through-put.

Next, at block 1108, the process 1100 determines whether the performance of any of the provisional PEs is better than the performance of the degraded PE. In some such embodiments, if any of the provisional PEs performs better than the degraded PE, then at block 1110 the process 1100 performs a switchover to the best performing provisional PE as a replacement for the degrading PE, and the degrading PE and remaining provisional PEs are shut down. In some embodiments, the switchover includes connecting the output/downstream side of the provisional PE to the next immediate downstream PE of the degrading PE.

Figure 12:
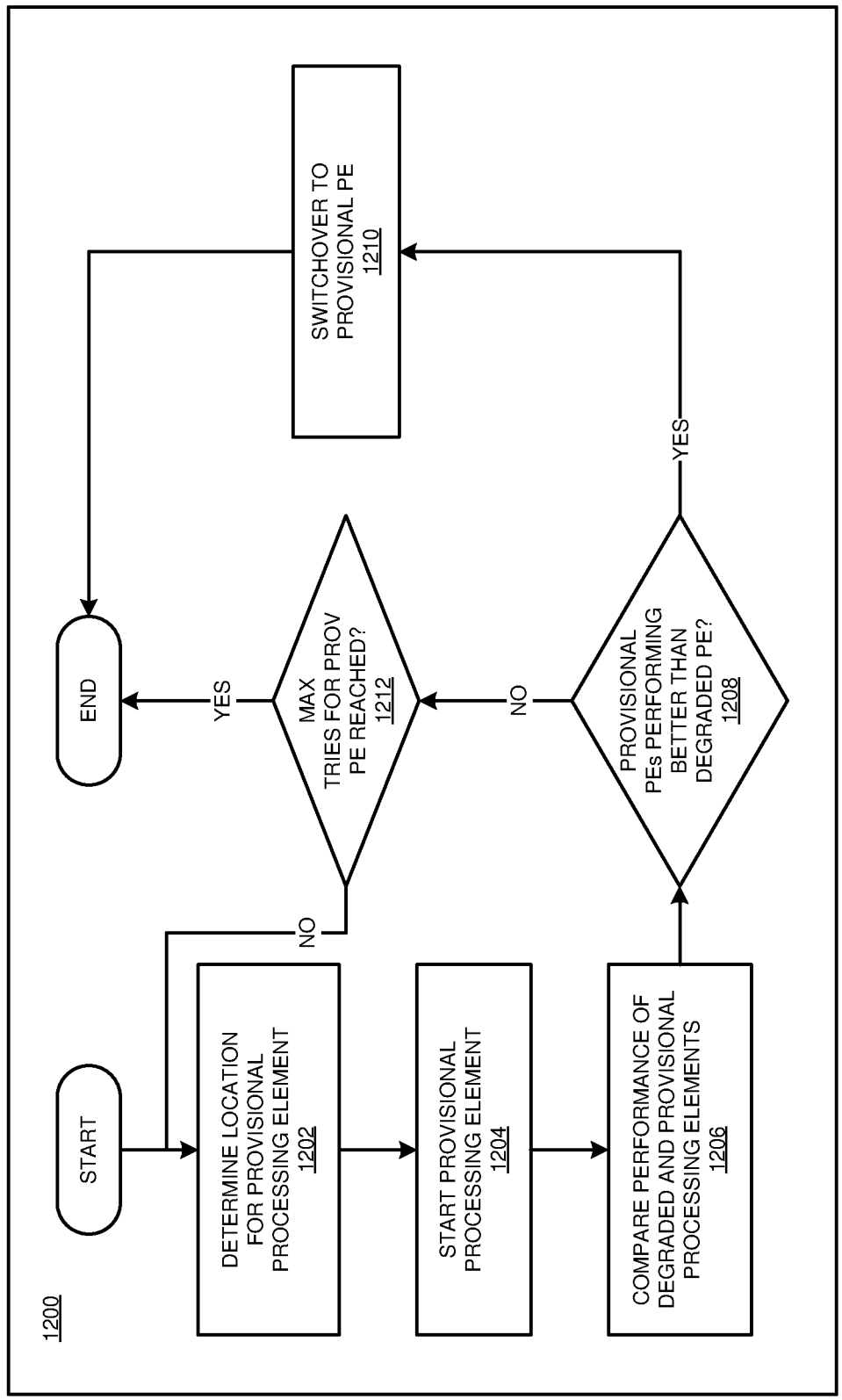
FIG. 12 depicts a flowchart of an example provisional PE troubleshooting process in accordance with an illustrative embodiment.

With reference to FIG. 12, this figure depicts a flowchart of an example dynamic PE replacement process 1200 in accordance with an illustrative embodiment. In a particular embodiment, the provisional PE analysis module 600 in FIG. 6 carries out the process 1200. In an embodiment, the process 1200 is an example of the provisional PE troubleshooting process at block 914 of FIG. 9.

In the illustrated embodiment, the process 1200 tests the use of a provisional processing element as a possible replacement for a degrading PE. At block 1202, the process 1200 determines a location for a provisional PE. In some embodiments, the process 1200 uses a scheduler to identify a node on which to deploy the provisional PE. In some such embodiments, the scheduler determines a list of best nodes to run the provisional PEs. In some embodiments, the scheduler also determines the number of provisional PEs to deploy, for example based on availability of nodes on which the deploy the provisional PEs. In some such embodiments, the scheduler excludes the node on which the degrading PE is running when determining best node(s) to run the provisional PEs.

Next, at block 1204, the process 1200 starts the provisional PE on the node selected at block 1202. In some embodiments, the provisional PE is started at runtime while maintaining runtime operation of the degrading PE. In some embodiments, the provisional PE is only connected on its upstream side, and is connected to the immediate next upstream PE of the degrading PE. This connection results in both the provisional PE and the degrading PE receiving the same stream of tuples from the same upstream PE at the same time.

Next, at block 1206, the process 1200 compares the performance of the degraded PE and the provisional PE. In some such embodiments, the provisional PE performs the same defined processing on the stream of tuples as the degrading PE, which allows for a performance-based comparison of the provisional PE and the degrading PE. In some embodiments, a performance comparator or streams manger compares the operation of the provisional PE to that of the degrading PE based on a performance metric associated with one or more computing resources. For example, in some embodiments, the provisional PE and the degrading PE are compared based on one or more of CPU usage, memory usage, and/or speed of tuple through-put.

Next, at block 1208, the process 1200 determines whether the performance of the provisional PE is better than the performance of the degraded PE. In some such embodiments, if the provisional PE does not perform better than the degraded PE, then at block 1212 the process 1200 determines whether a maximum number of provisional PEs have been tried. If so, the process ends. If not, the process returns to block 1202 to perform a next iteration of blocks 1202-1208 using another provisional PE at a different location (e.g., deployed on a node other than the node on which the degrading PE is deployed, and also other than node(s) used for previous iterations of blocks 1202-1208).

In some embodiments, the maximum number of provisional PEs at block 1212 is a fixed predetermined value. In some embodiments, the maximum number of provisional PEs at block 1212 is a user-configurable value that is initially set to a default value and is adjustable by user inputs. In some embodiments, the process 1100 determines the maximum number of provisional PEs at block 1212 based on any number of implementation-specific factors, for example the type of degrading PE being replicated (i.e., the operations performed by one or more operators on the degrading PE), the size of the streams application, the number of available nodes already being used by the streams application, and/or any other desired factors.

In some such embodiments, if any of the iterations of blocks 1202-1208 result in the provisional PE performing better than the degraded PE, then at block 1210 the process 1200 performs a switchover to the provisional PE as a replacement for the degrading PE, and the degrading PE is shut down. In some embodiments, the switchover includes connecting the output/downstream side of the provisional PE to the next immediate downstream PE of the degrading PE.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   monitoring, at runtime, in a distributed computing application wherein a processing element (PE) operating on a first node processes a first stream of tuples from an upstream PE and transmits a second stream of tuples to a downstream PE, an occurrence of a degradation condition on the PE;
   processing at a first provisional PE on a second node while maintaining runtime operation of the PE, the first stream of tuples from the upstream PE; and
   connecting the first provisional PE to replace the second stream of tuples from the PE to the downstream PE with a third stream of tuples from the first provisional PE to the downstream PE.

2. The computer implemented method of claim 1, further comprising selecting the second node from among a plurality of nodes for executing the first provisional PE.

3. The computer implemented method of claim 2, wherein the selecting of the second node from among the plurality of nodes is based at least in part on availability of computing resources on the second node.

4. The computer implemented method of claim 1, wherein the first provisional PE receives the first stream of tuples from the upstream PE and performs a defined process on the first stream of tuples while the PE receives the first stream of tuples from the upstream PE and performs the defined process on the first stream of tuples.

5. The computer implemented method of claim 4, further comprising starting a second provisional PE on a third node at runtime while maintaining runtime operation of the PE, wherein the second provisional PE receives the first stream of tuples from the upstream PE and performs the defined process on the first stream of tuples while the first provisional PE and the PE each receives the first stream of tuples from the upstream PE and each performs the defined process on the first stream of tuples.

6. The computer implemented method of claim 5, wherein the connecting is responsive to comparing an operation of the PE to an operation of the first provisional PE, and further responsive to comparing an operation of the second provisional PE to the operation of the PE and to the operation of the first provisional PE based on a performance metric associated with a computing resource.

7. The computer implemented method of claim 1, further comprising:
   starting the first provisional PE; and starting, prior to starting the first provisional PE, a second provisional PE on a third node at runtime while maintaining runtime operation of the PE,
wherein the second provisional PE receives the first stream of tuples from the upstream PE and performs a defined process on the first stream of tuples.

8. The computer implemented method of claim 7, further comprising, prior to starting the first provisional PE:
comparing an operation of the PE to an operation of the second provisional PE based on a performance metric associated with a computing resource.

9. The computer implemented method of claim 8, wherein the comparing of the operation of the PE to the operation of the second provisional PE results in identifying the operation of the PE exceeding operation of the second provisional PE based on the performance metric.

10. A computer program product comprising one or more computer readable storage medium . . . stored on the one or more computer readable storage medium, the program instructions executable by a processor to cause the processor to perform operations comprising:
monitoring a distributed computing application at runtime for occurrence of a condition,
wherein the distributed computing application comprises a first node that includes a PE receiving a first stream of tuples from an upstream PE, performing a defined process on the first stream of tuples resulting in a second stream of tuples, and transmitting the second stream of tuples to a downstream PE, and
wherein the condition includes occurrence of a degradation condition on the PE;
starting a first provisional PE on a second node at runtime while maintaining runtime operation of the PE,
wherein the first provisional PE receives the first stream of tuples from the upstream PE and performs the defined process on the first stream of tuples;
comparing operation of the PE to operation of the first provisional PE based on a performance metric associated with a computing resource; and
connecting the first provisional PE to replace the second stream of tuples from the PE to the downstream PE with a third stream of tuples from the first provisional PE to the downstream PE.

11. The computer program product of claim 10, wherein the stored program instructions are stored in a computer readable storage medium in a data processing system, and wherein the stored program instructions are transferred over a network from a remote data processing system.

12. The computer program product of claim 10, wherein the stored program instructions are stored in a computer readable storage medium . . . for use in a computer readable storage medium associated with the remote data processing system, further comprising:
program instructions to meter use of the program instructions associated with the request; and
program instructions to generate an invoice based on the metered use.

13. The computer program product of claim 10, further comprising selecting the second node from among a plurality of nodes for executing the first provisional PE.

14. The computer program product of claim 10, wherein the first provisional PE receives the first stream of tuples from the upstream PE and performs the defined process on the first stream of tuples while the PE receives the first stream of tuples from the upstream PE and performs the defined process on the first stream of tuples.

15. The computer program product of claim 14, further comprising starting a second provisional PE on a third node at runtime while maintaining runtime operation of the PE,
wherein the second provisional PE receives the first stream of tuples from the upstream PE and performs the defined process on the first stream of tuples while the first provisional PE and the PE each receives the first stream of tuples from the upstream PE and each performs the defined process on the first stream of tuples.

16. The computer program product of claim 15, wherein the comparing of the operation of the PE to operation of the first provisional PE further comprises comparing the operation of the second provisional PE to the operation of the PE and to operation of the first provisional PE based on the performance metric associated with the computing resource.

17. A computer system comprising a processor and one or more computer readable storage medium . . . stored on the one or more computer readable storage medium, the program instructions executable by the processor to cause the processor to perform operations comprising:
monitoring a distributed computing application at runtime for occurrence of a condition,
wherein the distributed computing application comprises a first node that includes a PE receiving a first stream of tuples from an upstream PE, performing a defined process on the first stream of tuples resulting in a second stream of tuples, and transmitting the second stream of tuples to a downstream PE, and
wherein the condition includes occurrence of a degradation condition on the PE;
starting a first provisional PE on a second node at runtime while maintaining runtime operation of the PE,
wherein the first provisional PE receives the first stream of tuples from the upstream PE and performs the defined process on the first stream of tuples;
comparing operation of the PE to operation of the first provisional PE based on a performance metric associated with a computing resource; and
connecting the first provisional PE to replace the second stream of tuples from the PE to the downstream PE with a third stream of tuples from the first provisional PE to the downstream PE.

18. The computer system of claim 17, further comprising selecting the second node from among a plurality of nodes for executing the first provisional PE.

19. The computer system of claim 17, wherein the first provisional PE receives the first stream of tuples from the upstream PE and performs the defined process on the first stream of tuples while the PE receives the first stream of tuples from the upstream PE and performs the defined process on the first stream of tuples.

20. The computer system of claim 19, further comprising starting a second provisional PE on a third node at runtime while maintaining runtime operation of the PE,
wherein the second provisional PE receives the first stream of tuples from the upstream PE and performs the defined process on the first stream of tuples while the first provisional PE and the PE each receives the first stream of tuples from the upstream PE and each performs the defined process on the first stream of tuples.

* * * * *